UNITED STATES PATENT OFFICE.

SAMUEL T. FRASER, WILLIAM E. GILLILAND, AND DAVID J. WILSON, OF BAIRD, TEXAS.

HAIR-TONIC.

SPECIFICATION forming part of Letters Patent No. 454,401, dated June 16, 1891.

Application filed November 24, 1890. Serial No. 372,433. (No specimens.)

*To all whom it may concern:*

Be it known that we, SAMUEL T. FRASER, WILLIAM E. GILLILAND, and DAVID J. WILSON, citizens of the United States, residing at Baird, in the county of Callahan and State of Texas, have invented new and useful Improvements in a Compound for the Removal and Prevention of Dandruff, of which the following is a specification.

This invention relates to a composition of matter to be used for the removal and prevention of dandruff.

Our composition consists of the following ingredients, combined in the manner and in about the proportions stated, namely: pure water, eight fluid ounces; chloral hydrate, forty grains; sulphate of magnesia, one dram; purple aniline, one-quarter grain; cologne-water, one fluid dram; tincture of cantharides, one fluid dram.

The water is first boiled, and then, while hot, the aniline is added. After the water has cooled it should be strained, and the other ingredients above named are then added. All the ingredients should then be thoroughly mingled by agitation.

This mixture is to be applied to the scalp every night for three or four nights, and then twice a week until a cure is effected. As the ingredients are all compatible with each other, they will have their characteristic effects.

The compound is tonic, stimulant, and antiseptic, preventing decomposition and cleansing and imparting normal tone to the scalp and roots of the hair.

What we claim as our invention is—

The herein-described composition of matter to be used for removing and preventing dandruff, to allay all itching of the scalp, and prevent the hair from falling out, consisting of water, chloral hydrate, sulphate of magnesia, cologne-water, and tincture of cantharides, in the proportions specified.

In testimony whereof we have hereunto set our hands and affixed our seals in presence of two subscribing witnesses.

SAMUEL T. FRASER. [L. S.]
WILLIAM E. GILLILAND. [L. S.]
D. J. WILSON. [L. S.]

Witnesses:
J. W. DAY,
JUSTIN COOK.